United States Patent
Snyder, II et al.

(10) Patent No.: US 10,447,823 B2
(45) Date of Patent: Oct. 15, 2019

(54) PACKET PARSING ENGINE

(71) Applicant: CAVIUM, LLC, San Jose, CA (US)

(72) Inventors: Wilson Parkhurst Snyder, II, Holliston, MA (US); Daniel Adam Katz, Ashland, MA (US); Varada Ramesh Ogale, Framingham, MA (US)

(73) Assignee: Marvell Semiconductor, Inc., Santa Clara, CA (US)

( * ) Notice: Subject to any disclaimer, the term of this patent is extended or adjusted under 35 U.S.C. 154(b) by 299 days.

(21) Appl. No.: 14/150,622

(22) Filed: Jan. 8, 2014

(65) Prior Publication Data
US 2015/0195384 A1 Jul. 9, 2015

(51) Int. Cl.
*H04L 29/06* (2006.01)
*G06F 9/38* (2018.01)
*G06F 9/50* (2006.01)

(52) U.S. Cl.
CPC ............ *H04L 69/22* (2013.01); *G06F 9/3836* (2013.01); *G06F 9/3867* (2013.01); *G06F 9/3887* (2013.01); *G06F 9/505* (2013.01); *H04L 69/12* (2013.01)

(58) Field of Classification Search
USPC ........................................................ 370/474
See application file for complete search history.

(56) References Cited

U.S. PATENT DOCUMENTS

| 5,841,998 A * | 11/1998 | Isaman | G06F 9/30032 712/208 |
| 7,266,182 B2 * | 9/2007 | Creamer | H04M 3/42144 379/88.17 |
| 7,796,627 B2 | 9/2010 | Hurley et al. | |
| 8,849,693 B1 * | 9/2014 | Koyfman | G06Q 90/00 705/14.1 |
| 2002/0083210 A1 * | 6/2002 | Harrison | G06F 17/3061 719/310 |
| 2003/0222995 A1 * | 12/2003 | Kaplinsky | H04N 5/3675 348/247 |
| 2005/0238022 A1 * | 10/2005 | Panigrahy | H04L 63/0254 370/392 |
| 2006/0034461 A1 * | 2/2006 | Park | H04L 9/083 380/277 |
| 2007/0110053 A1 * | 5/2007 | Soni | H04L 63/0263 370/389 |

(Continued)

Primary Examiner — Gregory B Sefcheck
Assistant Examiner — Majid Esmaeilian

(57) ABSTRACT

A packet parsing engine comprises a DMEM configured to store packet data; one or more registers configured to store parsing instructions or parse results; and one or more arithmetic logic units configured to parse the packet data based on the parsing instructions and to derive the parse results. The engine may be one engine of a plurality of engines configured to access a shared memory, and the engine may be configured to receive data from the shared memory or to send data to the shared memory. The DMEM may be divided into subsections, and at least one of the one or more registers may be divided into subsections, and the subsections may be configured such that while a DMEM subsection and its corresponding register subsection is parsing packet data for a first packet, one or more other subsections load packed data or unload parse results for a second packet.

16 Claims, 13 Drawing Sheets

(56) References Cited

U.S. PATENT DOCUMENTS

| | | | |
|---|---|---|---|
| 2008/0189521 A1* | 8/2008 | Augsburg | G06F 9/3842 712/214 |
| 2012/0011351 A1* | 1/2012 | Mundra | G06F 21/72 713/1 |
| 2013/0120168 A1* | 5/2013 | Kumar | H03M 7/3059 341/90 |
| 2014/0282437 A1* | 9/2014 | Ma | G06F 8/52 717/136 |
| 2014/0304320 A1* | 10/2014 | Taneja | H04L 69/16 709/203 |
| 2015/0081726 A1* | 3/2015 | Izenberg | H04L 47/2433 707/755 |
| 2015/0082002 A1* | 3/2015 | Parra | G06F 13/16 711/216 |
| 2015/0161758 A1* | 6/2015 | Ashbaugh | G06F 12/00 345/538 |
| 2015/0178089 A1* | 6/2015 | Brunheroto | G06F 9/3851 712/215 |
| 2015/0356054 A1* | 12/2015 | Barak | G06F 15/8023 712/22 |

* cited by examiner

| | | | | | | | | | | | | | |
|---|---|---|---|---|---|---|---|---|---|---|---|---|---|
| 1102 Instruction No. | i | ii | iii | iv | v | vi | vii | viii | ix | x | xi | xii | xiii |
| 1103 Instruction | x | X SMEM | x | x | x | x | x | X SMEM | ix | x | x | x | x.... |
| 1104 TIME (cycle) | 1 | 2 | 3 | 4 | 5 | 6 | 7 | 8 | 9 | 10 | 11 | 12 | 13 | 14 | 15 | 16 | 17 |
| 1105 Engine 0 PC | i | ii | iii | iv | v | vi | vii | ix | ix | x | xi | xii | xiii | x.... | | | |
| 1106 Engine 1 PC | | i | ii | iii | iv | v | vi | vii | vii | ix | x | xi | xii | xiii.... | | | |
| 1107 Engine 2 PC | | | i | ii | iii | iv | v | vi | vi | vii | ix | x | xi | xii | xiii.... | | |
| 1108 Engine 3 PC | | | | i | ii | iii | iv | v | v | vi | vii | ix | x | xi | xii | xiii.... | |
| 1109 Engine 4 PC | | | | | i | ii | iii | iv | iv | v | vi | vii | ix | x | xi | xii | xiii... |
| 1110 TIME (cycle) | 1 | 2 | 3 | 4 | 5 | 6 | 7 | 8 | 9 | 10 | 11 | 12 | 13 | 14 | 15 | 16 | 17 |
| 1111 Engine 0 Instr | x | X SMEM | x | x | x | x | x | X SMEM | x | x | x | x | x.... | | | | |
| 1112 Engine 1 Instr | | x | X SMEM | x | x | x | x | x | X SMEM | x | x | x | x | x.... | | | |
| 1113 Engine 2 Instr | | | x | X SMEM | x | x | x | x | x | X SMEM | x | x | x | x | x.... | | |
| 1114 Engine 3 Instr | | | | x | X SMEM | x | x | x | x | x | X SMEM | x | x | x | x | x.... | |
| 1115 Engine 4 Instr | | | | | x | X SMEM | x | x | x | x | x | X SMEM | x | x | x | x | x.... |
| 1116 TIME (cycle) | 1 | 2 | 3 | 4 | 5 | 6 | 7 | 8 | 9 | 10 | 11 | 12 | 13 | 14 | 15 | 16 | 17 |
| 1117 SMEM accessed by | idle | Eng 0 | Eng 1 | Eng 2 | Eng 3 | Eng 4 | idle | Eng 0 | Eng 1 | Eng 2 | Eng 3 | Eng 4 | | | | | |

PACKET PARSING ENGINE

RELATED APPLICATIONS

This application is related to the concurrently filed U.S. patent applications titled "Methods and Systems for Flexible Packet Classification," Ser. No. 14/150,657; and "Floating Mask Generation for Network Packet Flow," Ser. No. 14/150,664. The entire contents of both applications are incorporated herein by reference.

TECHNICAL FIELD

The present disclosure relates generally to computer networks and in particular to methods and systems for parsing network packets.

BACKGROUND

Many electronic devices, such as computers, communicate via network packets. The network packets are usually sent from a source to a destination. During this journey the packet may pass through one or more intermediary recipients before reaching the final recipient, i.e., the destination. Different types of recipients include network processors, network switches, and network interfaces. Each recipient of the packet may need to parse the packet, that is, analyze the data in the packet to determine its characteristics. The characteristics of a network packet may include its source, destination, or type. The recipients utilize parsing mechanisms to perform the parsing. As part of the parsing, the recipient may split the bytes in the packet into its different network protocol layers and fields within those protocols, to enable further processing.

The number and complexity of network protocols are constantly growing. Previous parsing techniques lack the required flexibility and speed to handle this growth. To handle a new or an updated networking protocol, for example, these techniques may require updating their networking hardware or software. Otherwise, the systems may not be able to service the new or updated protocol or may service it at a lower than desirable speeds.

SUMMARY

Some embodiments provide a packet parsing engine comprising a data memory ("DMEM") configured to store packet data; one or more registers configured to store parsing instructions or parse results; and one or more arithmetic logic units configured to parse the packet data based on the parsing instructions and to derive the parse results. According to some embodiments, the engine is one engine of a plurality of engines and wherein the plurality of engines are configured to access a shared memory, and wherein the engine is configured to receive data from the shared memory or to send data to the shared memory.

According to some embodiments, the DMEM is divided into two or more DMEM subsections, and at least one of the one or more registers is divided into two or more register subsections, each register subsection corresponding to a DMEM subsection, and wherein the subsections are configured such that while a DMEM subsection and its corresponding register subsection is parsing packet data for a first packet, one or more other subsections load packed data or unload parse results for a second packet. According to some embodiments, the DMEM and the registers are each divided into two subsections. According to some embodiments, the engine is configured such that before parsing each packet data one or more register files for the one or more registers are initialized. According to some embodiments, the one or more register files are initialized through the instructions.

According to some embodiments, the engine is one engine of a plurality of engines and wherein the plurality of engines are configured to access a shared memory, and wherein the one or more register files are initialized by receiving data from the shared memory. According to some embodiments, the parsing instructions are wide 64 bits. According to some embodiments, two or more of the DMEM, the one or more registers, and the one or more arithmetic logic units communicate via 16 bit data.

Some embodiments provide a method of parsing packet data by a packet parsing engine, wherein the engine includes a DMEM, one or more registers, and one or more arithmetic units (ALUs), the method comprising: storing data for a packet in the DMEM; storing parsing instructions in the one or more registers; parsing, by the ALUs, packet data based on the parsing instructions and deriving parse results; and storing parse results in the one or more registers. According to some embodiments, the engine is one engine of a plurality of engines and the method further comprises accessing a shared memory that is configured to be accessed by the plurality of engines, wherein the accessing includes receiving data from the shared memory or sending data to the shared memory. According to some embodiments, the DMEM is divided into two or more DMEM subsections, and at least one of the one or more registers is divided into two or more register subsections, each register subsection corresponding to a DMEM subsection, the method further comprising parsing packet data for a first packet by a DMEM subsection and its corresponding register subsection while one or more of other subsections load packed data or unload parse results for a second packet. According to some embodiments, the DMEM and the registers are each divided into two subsections. According to some embodiments, the method further comprises initializing one or more register files for the one or more registers before parsing each packet data. According to some embodiments, the one or more register files are initialized through the instructions. According to some embodiments, the engine is one engine of a plurality of engines and wherein the plurality of engines are configured to access a shared memory, and wherein the one or more register files are initialized by receiving data from the shared memory. According to some embodiments, the parsing instructions are wide 64 bits. According to some embodiments, the method further comprises sending communications among two or more of the DMEM, the one or more registers, and the one or more arithmetic logic units via 16 bit data.

Some embodiments provide a method of parsing packet data by a packet parsing engine, the method comprising setting a state of the engine to an idle state; loading packet data to the engine and changing the state of the engine to an allocated state; starting parsing the packet data and changing the state of the engine to a processing state; and completing the parsing, unloading parse results, and setting the state of the engine to the idle state.

Some embodiments provide a non-transitory computer readable medium storing one or more programs, wherein the program, when executed by a packet parsing engine, causes the packet parsing engine to perform a method of parsing packet data, the method comprising setting a state of the engine to an idle state; loading packet data to the engine and changing the state of the engine to an allocated state; starting parsing the packet data and changing the state of the engine to a processing state; and completing the parsing, unloading parse results, and setting the state of the engine to the idle state.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification, and constitute a part of it, illustrate several embodiments consistent with the disclosure. Together with the description, the drawings serve to explain the principles of the disclosure.

In the drawings:

FIG. 11 shows a chart illustrating execution of an instruction stream in a cluster with a SIMD architecture according to some embodiments.

DETAILED DESCRIPTION

Figure 1:
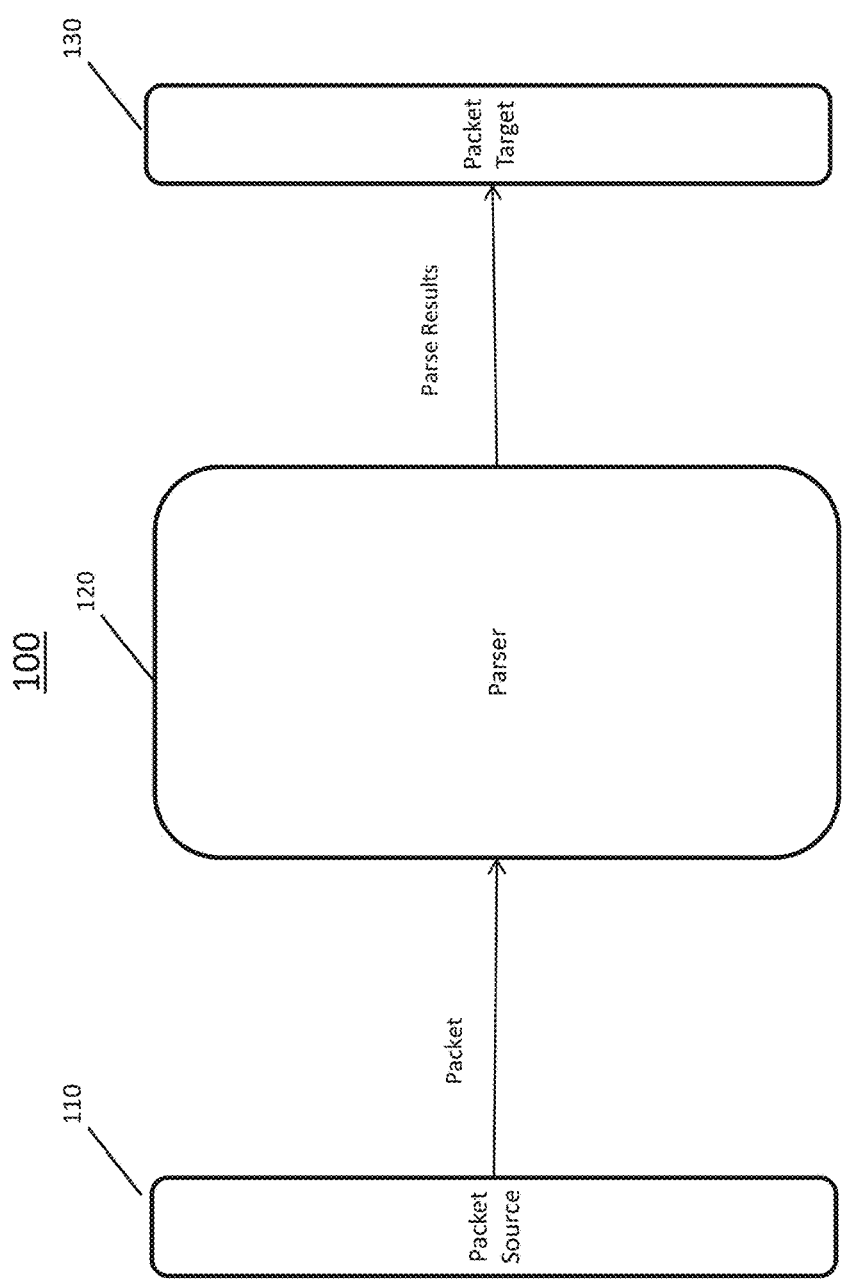
FIG. 1 is a block diagram of a packet parsing system according to some embodiments.

The following detailed description refers to the accompanying drawings. Wherever possible, the same or similar reference numbers are used in the drawings or in the description to refer to the same or similar parts. Also, similarly-named elements may perform similar functions and may be similarly designed, unless specified otherwise. Numerous details are set forth to provide an understanding of the described embodiments. The embodiments may be practiced without these details. In other instances, well-known methods, procedures, and components have not been described in detail to avoid obscuring the described embodiments.

While several exemplary embodiments and features are described here, modifications, adaptations, and other implementations may be possible, without departing from the spirit and scope of the invention. Accordingly, unless explicitly stated otherwise, the descriptions relate to one or more embodiments and should not be construed to limit the invention as a whole. This is true regardless of whether a reference is or is not explicitly made to state that a feature is relevant to "one or more," "some," or "various" embodiments. Instead, the proper scope of the invention is defined by the appended claims. Further, stating that a feature may exist indicates that the feature exists in one or more embodiments.

In this disclosure, the terms "include," "comprise," "contain," and "have," when used after a set or a system, mean an open inclusion and do not exclude addition of other, non-enumerated, members to the set or to the system. Moreover, as used in this disclosure, a subset of a set can include one or more than one, including all, members of the set.

Various embodiments utilize novel patent parsing mechanisms that enable efficient handling of various network packet types. In various embodiments, a packet parsing system receives network packets, parses those packets, and delivers the parse results to one or more recipients (also called here targets). Unless stated otherwise, the terms network packet, packet, or packet data are used interchangeably to indicate network packets that are transmitted according to one or more network protocols. FIG. 1 is a block diagram of a packet parsing system 100 according to some embodiments. Packet parsing system 100 includes a packet source 110, a packet parser 120, and a packet 130.

Packet source 110 sends one or more packets to parser 120. Packet source 110 may include, for example, one or more packet transmitters such as one or more semiconductor systems that implement system 100, an Ethernet MAC, a network switch, a network processor, or a network interface of the one or more computers that implement system 100.

Parser 120 is a parsing system configured to parse the received packets and extracts from those packets some parse results. Parser 120 is explained below in more detail. In some embodiments, the parse results include information related to one or more protocol layers and fields within those protocols according to which the packets are built.

The parse results, for example, may include the type of the packet's protocol, whether one or more fields or layers of that protocol are present in the packet, the packet destination, or a subset of the information in the layers or fields that are present. In some embodiments, in addition to the above parse results, the parser also derives some other information such as style values or mask tags.

In various embodiments, packet target 130 includes one or more systems that receive from parser 120 the parse results and use those results in their operation. Packet target 130 may also receive part or all of the parsed packet itself along with the parse results. Packet target 130 may include, for example, parts of one or more computers on which system 100 is installed, an Ethernet MAC, a DMA, a network switch, a network processor, or a network interface.

Figure 2:
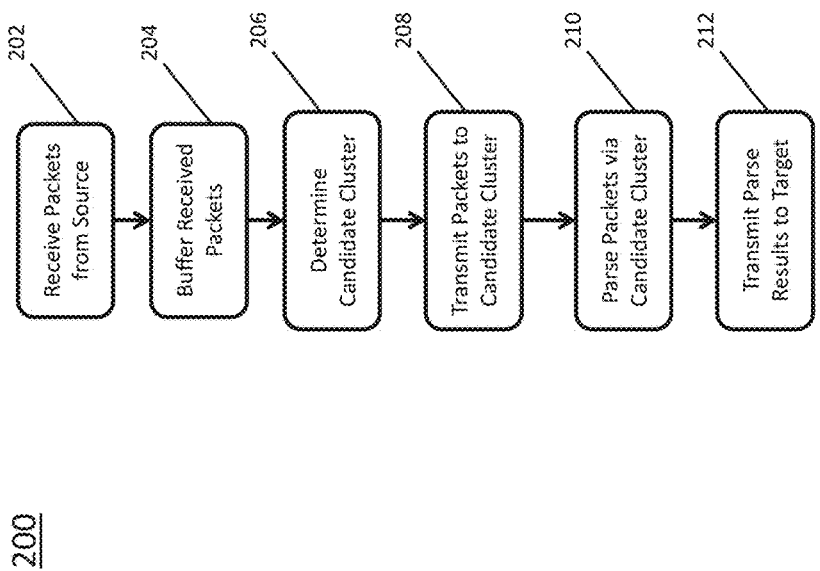
FIG. 2 shows a flow chart for packet parsing by a parser according to some embodiments.

In various embodiments, parser 120 includes a plurality of parsing clusters as explained below in more detail. Each parsing cluster may include one or more parsing engines that are configured to parse received packets. FIG. 2 shows a flow chart 200 for packet parsing by such a parser according to some embodiments.

In block 202, the parser receives one or more packets from the packet source. In block 204, the parser buffers the received packets for further processing.

In block 206, the parser determines a candidate cluster in the parser that can parse a subset of the received packets. In block 208, the parser transmits the subset of received packets to the candidate cluster for parsing. In block 210, the candidate cluster parses the subset of packets and derives parse results from those packets. In block 212, the parser collects the parse results from the candidate cluster and transmits that information to the packet target.

Figure 3:
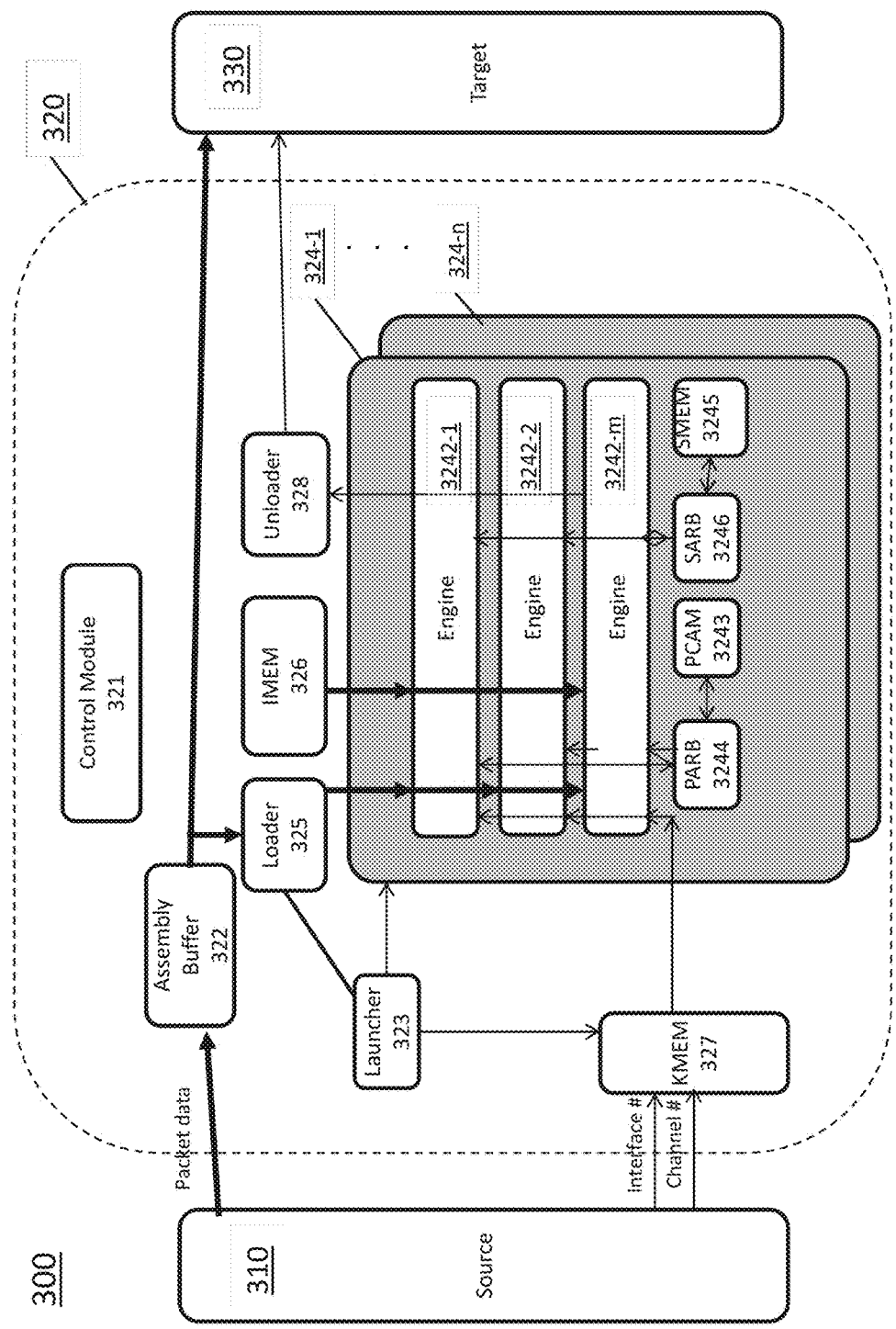
FIG. 3 shows a block diagram of a packet parsing system and illustrates a method performed by that system according to some embodiments.

In various embodiments, each of the above listed blocks in flowchart 200 is performed by one or more sections of the packet parsing system. FIG. 3 shows a block diagram of a packet parsing system 300 and illustrates a method performed by that system according to some embodiments.

System 300 includes a packet source 310, a parser 320, and a packet target 330. Moreover, parser 320 includes a control module 321, an assembly buffer 322, a launcher module 323, one or more clusters 324 (labeled 324-1 to 324-n), a loader module 325, an IMEM 326, a KMEM 327, and an unloader module 328. Each cluster 324 includes one or more engines 3242 (labeled for cluster 324-1 as engines 3242-1 to 3242-m), a shared CAM, i.e., PCAM 3243, a PCAM arbiter module PARB 3244, a shared memory SMEM 3245, and an SMEM arbiter module SARB 3246. Parser 320 or clusters 324 may also include one or more additional storage modules for storing one or more software structures or data used by parser 320 or cluster 324. In some embodiments, SMEM 3245 is a storage structure containing lookup tables that are referenced by the parser. The lookup tables may include information such as configuration information for DIFFSRV values and IEEE 802.1 VLAN identifiers. Moreover, PCAM may be for example a ternary content addressable memory containing IP destination addresses to match as part of the parsing. PARB 3244 and SARB 3246 may be multiple input arbiters such as round robin arbiters.

According to various embodiments, control module 321 is configured to program one or more of the various memories and registers, as explained below in more detail. In some embodiments, control module 321 performs one or more program control functions. Assembly buffer 322 is configured to receive packet data from source 310 and store that data for further processing. In various embodiments, assembly buffer 322 includes one or more storage devices for storing the data. Assembly buffer 332 may have capacity for storing a multitude of packets that are all in process of being parsed as described below.

Parser 320 includes one or more clusters 324, each of which is configured to perform the parsing. FIG. 3 shows n clusters labeled 324-1 to 324-n. Further, as shown in FIG. 3, cluster 324 includes one or more engines 3242. FIG. 3 shows that cluster 324-1 includes m engines 3242-1 to 3242-m. In various embodiments, m and n are positive integers. Each engine 3242 is configured to parse packets as detailed below.

IMEM 326 stores instructions used by each engine for parsing packets and KMEM 327 stores information for initializing register files of each engine in the clusters. Moreover, engines in each cluster may access shared PCAM 3243 of the cluster through arbiter PARB 3244; or access shared memory SMEM 3245 of the cluster through arbiter SARB 3246.

Launcher module 323 is a central arbitration resource. Launcher 323 is configured to select and launch a candidate cluster to parse a subset of the packets stored in assembly buffer 322. In various embodiments, launcher 323 uses a selection algorithm to select a free cluster as the candidate cluster in a manner detailed below. Launcher module 323 may allocate for parsing the subset of packets to the candidate cluster, and the candidate cluster distributes the subset of packets among its engines to be parsed. Launcher module 323 may also allocate for parsing each packet in the subset of packets to one of the engines in the candidate cluster.

Loader 325 receives the allocation information from launcher 323 and accordingly transmits the subset of packets from assembly buffer 322 to the candidate cluster or to the engines in the candidate cluster. Each allocated engine receives the allocated packet to parse that data and derive parse information for that packet.

In various embodiments, each engine can be in one of a plurality of states. In some embodiments, the plurality of states of an engine includes an allocated state, a processing state, and an idle state. An allocated engine is an engine to which a packet has been allocated for parsing but the engine has not yet started parsing it. A processing engine is an engine that is parsing a packet that was allocated to that engine. In some embodiments, during each round of parsing, an engine parses the allocated packet, derives parse results for that packet, and outputs that result. Once this round of parsing is complete, the engine becomes idle. An idle engine is an engine that is not processing and to which no packet has been allocated. Such an idle engine is thus ready to be allocated a new packet, to receive data for that packet, and to parse that data in a new round of parsing. An engine may thus circle through states of idle, allocated, and processing.

In various embodiments, a cluster can also be in one of a plurality of states. In some embodiments, the plurality of states of a cluster includes a processing state, an idle state (which can be a fully idle state or a partially idle state), and an allocated state (which can be a partially allocated—same as partially idle—state and a fully allocated state). A processing cluster is a cluster in which at least one engine is in a processing state. For a processing cluster, even if some of its engines are idle, the cluster cannot accept and parse any new packets until all of its processing engines complete their parsing and become idle. An idle cluster is a cluster in which no engine is processing and at least one engine is idle (and thus unallocated). Special cases of an idle cluster are a fully idle cluster, in which all engines are idle (and thus unallocated), and a partially idle cluster, in which some of the engines are idle and the remainder are allocated. An allocated cluster is a cluster that is not processing and at least one engine is allocated. An allocated cluster may be a partially allocated or a fully allocated cluster. A partially allocated cluster is same as a partially idle cluster, one in which some engines are allocated and the remainder are idle. A fully allocated cluster is a cluster in which all engines are allocated and not processing. A fully allocated cluster has reached its parsing capacity and cannot accept any more packets to be allocated to its engines. A cluster thus may circle through states of idle, allocated, and processing.

In some embodiments, to parse a packet, the engine initializes one or more of its register files for the allocated packet. In some embodiments, KMEM 327 stores a KMEM table that contains initial data for that initialization. This table may be indexed by different items. The KMEM table may be indexed by the port and channel number on which the allocated packet arrives. The engine to which that packet is allocated receives information that is stored in the corresponding row of the KMEM table and uses that information to initialize its register file. The candidate cluster may have more than one engine. Each of those engines may be allocated a packet of the subset of packets and also initialized for parsing that packet based on the corresponding information in the KMEM table.

In some embodiments, the launcher module selects a candidate cluster from among one or more clusters that are idle, if any. In some of these embodiments, the launcher module selects a candidate cluster from among one or more clusters that are fully idle, if any. Alternatively, in some embodiments, the launcher module selects a candidate cluster from one or more clusters that are either fully idle or partially idle. In some of these embodiments, the launcher module allocates to such a candidate cluster the subset of packets. The subset of packets may be some or all of those packets that are stored in assembly buffer 322 and whose number does not exceed the number of idle engines in the candidate cluster. If no such partially idle or fully idle cluster is available, the launcher module may wait until one such cluster becomes available, that is, engines in that cluster complete their round of parsing and become idle.

In some embodiments, the parser launches a candidate cluster when a launch condition is met. When launched, the candidate cluster starts the parsing of the subset of packets allocated to the cluster, i.e., by moving all of its allocated engines to a processing state. In various embodiments, the launch condition is met when the candidate cluster becomes fully allocated. In some embodiments, the launch condition is met when one or more criteria are met, and while the candidate cluster can be partially or fully allocated. In some embodiments, such criteria are met when the candidate cluster becomes fully allocated, when another cluster becomes idle, or when a time limit is reached. These conditions are discussed below in more detail.

In some embodiments, one or more of the clusters are each a Single Instruction Multiple Data (SIMD) machine. When such a cluster is launched, it may fetch instructions for parsing the packets from IMEM 326, and feed those instructions to each of its allocated engines or all of its engines. In some embodiments, parser 320 includes one IMEM 326 for each cluster 324. In some other embodiments, parser 320 includes a global IMEM 326 that is time-multiplexed among more than one cluster 324. In various embodiments, a plurality of engines in one cluster 324 utilize the same IMEM 326 for reading parsing instructions.

Moreover, a processing engine may access resources that it shares with other engines in the cluster, such as PCAM 3243 and SMEM 3245. Access to PCAM 3243 is arbitrated among different engines by PARB 3244, and access to SMEM 3245 is arbitrated among different engines by SARB 3246. While a cluster is in a processing state, each of its processing engines may operate independently. That is, each processing engine parses its allocated packet data that is different from the data allocated to other engines. Moreover, each engine parses the allocated packet independent of other engines, that is, the same engine performs the parsing steps for the packet. A step in an engine's operation, however, may be delayed as it tries to access a shared resource that is being simultaneously used by another engine. Various embodiments use mechanisms that improve the sharing of resources, as further explained below. Moreover, in some embodiments, a cluster includes a communication mechanism among the engines in that cluster to facilitate usage of the shared resources, such as the shared resources in the cluster.

In some embodiments, when an engine completes parsing its allocated packet, the engine executes a "done" instruction, indicating a transition from processing state to idle state. In some embodiments, control module 321 receives the done instruction and accordingly changes the state of the engine from processing to idle. Unloader 328 unloads the parse results from that engine by storing it in target 330. Unloader 328 further transmits the parse results to target 330. Target 330 may also receive all or part of the packet data from assembly buffer 322.

In some embodiments, when all processing engines in a processing cluster become idle, the cluster itself becomes idle and may be used for a new round of parsing a new subset of packets.

Figure 4:
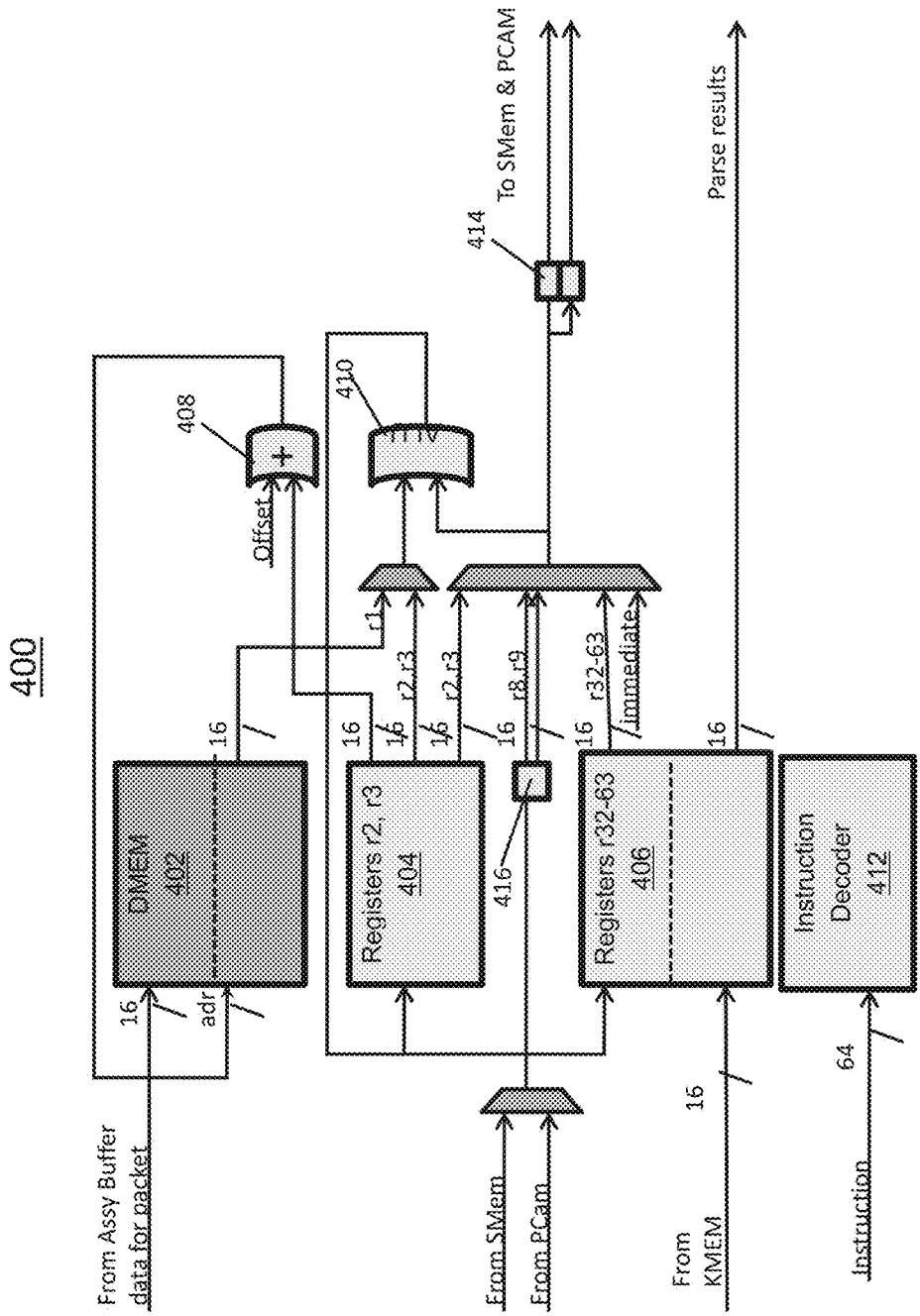
FIG. 4 is a block diagram of a packet parsing engine according to some embodiments.

FIG. 4 is a block diagram of a packet parsing engine 400 according to some embodiments. Engine 400 includes DMEM 402; register groups 404, and 406; adder unit 408, ALU 410, instruction decoder 412, and flops 414 and 416. In various embodiments, register groups 404 and 406 include 32 registers or two banks each including 32 registers.

DMEM 402 receives packet data from the assembly buffer and stores the data for processing. Register group 404 includes registers r2 and r3, configured to store information derived and further used during the parsing process by engine 400. In some embodiments, registers in register group 404 are utilized as scratch pads for storing intermediary information. In various embodiments, a flop may be implemented as a flip-flop, latch, or other types of storage structures.

Register group 406 includes registers r32 to r63. Registers in register group 406 may be initialized for parsing each packet and before the parsing begins. In various embodiments, these registers are initialized based on instructions received from IMEM, are set to some initial values such as zero independent of the received packet, or initialized based on information in KMEM. Moreover, these registers store parse results. Upon completion of parsing, the parse results are transmitted out of these registers.

Adder 408 may receive an offset value and information form register group 404, and accordingly calculate an address to determine what data to read from DMEM 402. In some embodiments, ALU 410 is a general purpose ALU that performs various operations required for the parsing process. ALU 410 may be a simple ALU limited to reading packages from DMEM 402 and operating on data in registers. The ALU operations may include operations such as add, XOR, or load immediate. In some embodiments the ALU operates on two 16-bit operands and produces a 16-bit result. In some embodiments, in which the Ethernet formats are based on 16-bit data, the structure of the ALU allows for an efficient width-versus-size tradeoff.

Instruction decoder 412 is configured to receive instructions from, e.g., IMEM, decode those instructions, and send relevant information and signals to various sections of engine 400. In some embodiments, received instructions are 64 bits-wide. Such instruction sizes enable minimizing complexity of engine 400 or reduce instruction count.

Flop 414 is configured to receive information from one or more of the registers in engine 400. In one embodiment, flop 414 receives information from registers r2-12 and r32-63. In some embodiments flop 414 includes two subsections, one of which sends data to the SMEM and the other sends data to the PCAM. Some of the information stored in PCAM and SMEM are directed into flop 416.

Instruction decoder 412 may transmit information or signals to one or more multiplexers in engine 400. Further, instructions derived from decoder 412 may control the read or write operations of the registers and the operations by ALU 410. In various embodiments, instructions cause data being read from one or more registers, data being passed to ALU 410, or results being loaded into one or more registers.

Instructions may further result in computing an effective address, reading the packet data in 16-bit widths, and placing the results into a register. Instructions may also cause sending data to blocks, such as those of SMEM or PCAM, which are shared with some other engines. These data may be stored in registers for later use.

In various embodiments, inputs and outputs of one or more elements in engine 400 are 16 bit data. As an example, as shown in FIG. 4, the outputs of register group 404 or register group 406 may be 16 bit data. Similarly, DMEM 402 may receive and transmit packet data as 16 bit information. As part of its operation, engine 400 combines some of the received information or generated data via multiplexers, as shown in FIG. 4.

Some embodiments implement double or multiple buffering to enhance the speed of the engine. In particular, DMEM 402 and register group 406 may have sizes that are multiples of that needed for parsing a single packet. DMEM 402 and register group 406 may each be accordingly divided into two or more subsections. In some embodiments, each subsection of DMEM 402 is paired to one subsection of register group 406. Each pair of subsections may collaborate in parsing one packet while another pair loads or unloads data for another packet.

In particular, in some embodiments, a first subsection of DMEM 402 loads information for a first packet. Further, a corresponding first subsection of register group 406 gets initialized based on the information in the first packet. These subsections then parse the first packet in collaboration with other parts of engine 400. During this parsing of the first packet, a second subsection of DMEM 402 loads data for a second packet and a corresponding second subsection of register group 406 gets initialized based on the data in the second packet. These second subsections may parse the second packet in collaboration with other parts of engine 400, after the first pair of subsections complete parsing of the first packet and while the first pair unload their parsing results or load data for a third packet.

In some embodiments, such division and alteration among pairs of subsections increases the efficiency of the engine as compared to the required increase to its size and power. Some embodiments divide the DMEM or register groups into more than two subsections. The engine may swap among pairs of subsections by toggling an address bit to the addresses of the multiple-sized subsections.

Figure 5:
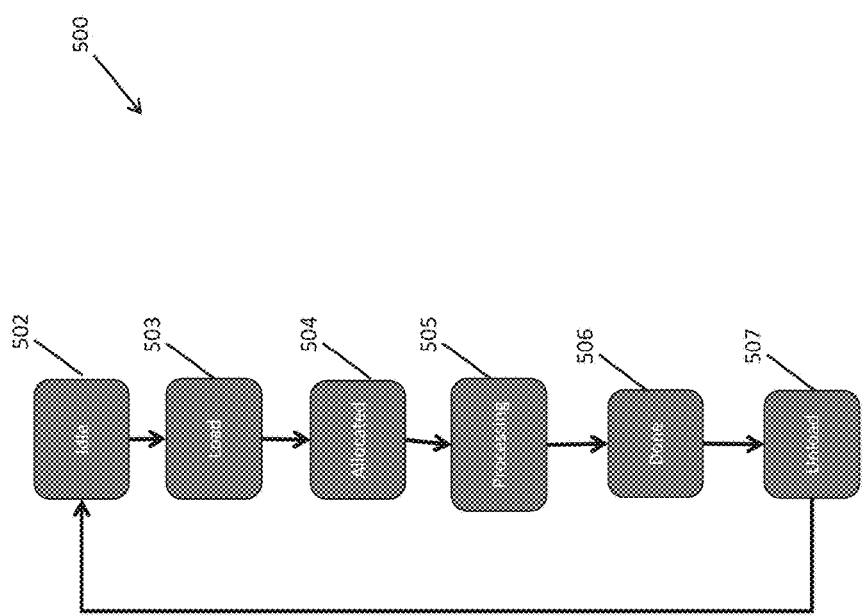
FIG. 5 is a flow chart for a packet parsing process performed by an engine according to some embodiments.

In various embodiments, the engine receives and parses a packet by transitioning among different states. FIG. 5 is a flow chart for a packet parsing process 500 performed by an engine according to some embodiments. Process 500 includes steps 502-507 related to different actions and states of an engine, such as engine 3242 in FIG. 3. In block 502, the engine is in an idle state, ready to receive and parse a packet. In block 503, the engine loads data for a packet allocated to that engine. In block 504, due to loading the data, the engine switches into the allocated state. In block 505, once the engine's cluster is launched, the engine transitions to the processing state and parses the data in the pocket. In block 506, upon completing the process, the engine executes a "done" instruction. In block 507, the parse results are unloaded from the engine and the engine transitions back to the idle state in block 502. As explained above, in some embodiments, some parts of an engine may be divided to subsections such that some subsections may perform loading of a packet or unloading of parse results for a packet, while some other subsections perform parsing of another packet.

In some embodiments, SIMD architectures enable efficient methods for simultaneously performing similar calculations against different data. A parser may include a SIMD architecture configured to perform similar parsing instructions against different packets. A SIMD architecture may include an instruction unit and a number of data units all utilizing an instruction stream from the instruction unit. In some embodiments, a SIMD unit includes multiple instructions units and a number of data units, each of which select and utilize one of the instruction units. Some embodiments with a single instruction unit provide a launcher mechanism that reduces latency and improves efficiency in processing the data. In some embodiments, the instructions include parsing instructions and a data unit is a cluster or an engine, configured to parse packets based on the instructions.

Figure 6:
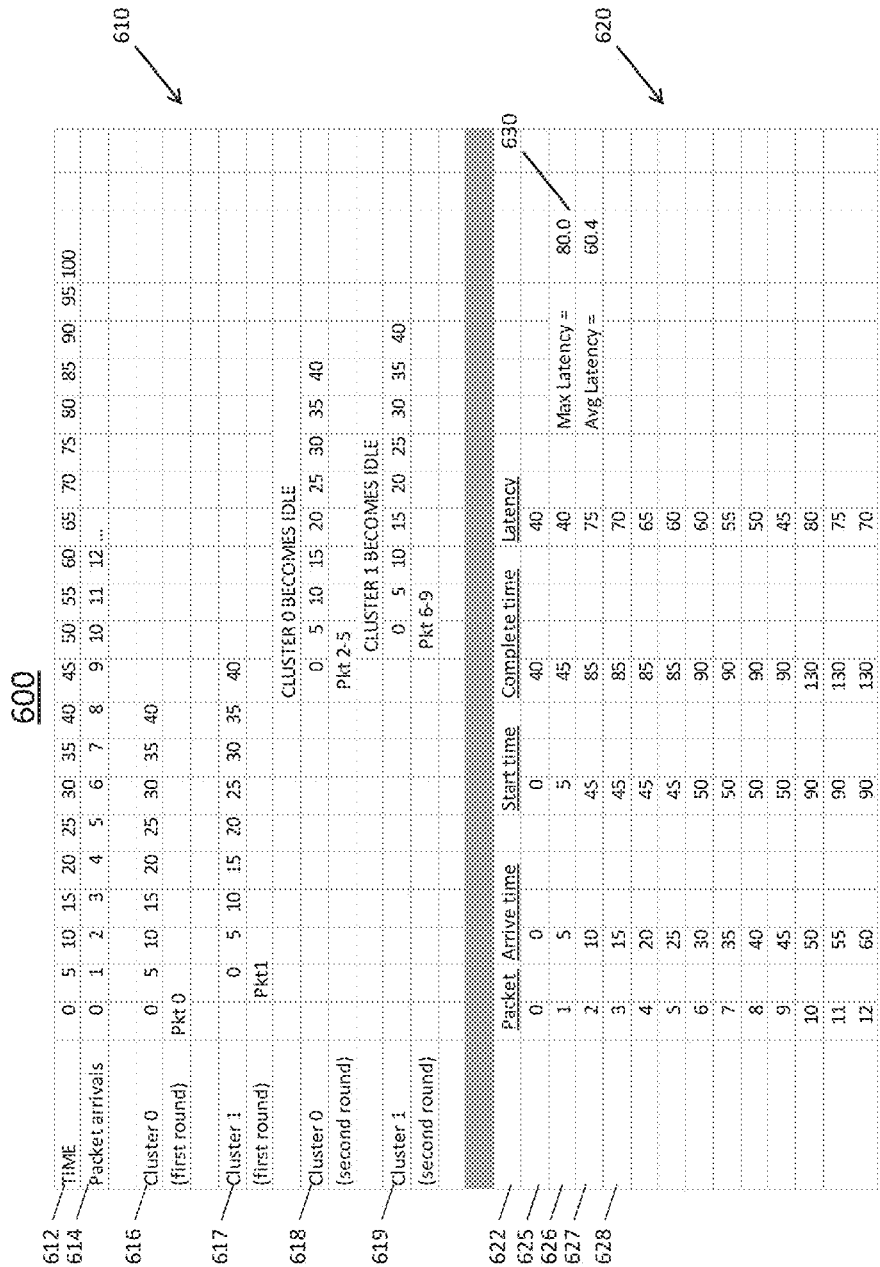
FIG. 6 shows a chart illustrating distribution of packets between two clusters and launching those clusters according to an embodiment.

In various embodiments, the parser parses packets as they arrive from one or more packet sources. The parser may include one or more clusters each of which may include one or more packet parsing engines. In various embodiments, a launcher mechanism in the parser distributes the packets among clusters and launches those clusters according to different criteria. In some embodiments, the launcher allocates packets to a cluster and launches it as soon as it becomes idle. FIG. 6 shows a chart 600 illustrating distribution of packets between two clusters and launching those clusters according to one such embodiment. In the example of FIG. 6, each of the two clusters includes four engines. Moreover, both clusters are assumed to be fully idle at the start.

Chart 600 includes a timeline table 610 and a summary table 620. Timeline table 610 includes rows 612, 614, and 616-619, and details an illustrative timeline for parsing thirteen packets as they sequentially arrive at a parser that includes the two clusters, indicated as clusters 0 and 1. Row 612 indicates the timeline measured from the arrival of the first packet (labeled as packet 0) and in some arbitrary unit of time. In various embodiments the unit of time can be a fraction of second, such as nanosecond, microsecond, or millisecond, or a number times one of these fractions. In particular, row 612 includes 21 entries dividing the timeline from 0 to 100 into 20 intervals in increments of 5 units. That is, for example, the first column corresponds to time 0, the second column to time 5, the third column to time 10, and so on, up to the twenty first column, which corresponds to time 100.

Row 614 indicates that the thirteen packets, indexed packets 0 to 12, arrive at the parser in intervals of 5 units. In particular, row 614 shows that packet 0 arrives at time 0, packet 1 at time 5, packet 2 at time 10, and so on. Rows 616-619 show how these thirteen packets are allocated to and parsed by the two clusters, as detailed below. In the example of FIG. 6, each engine takes 40 time units to parse a packet.

In particular, row 616 indicates that packet 0, upon its arrival at time 0, is allocated to cluster 0. Moreover, row 616 indicates that cluster 0 is also launched at time 0 to parse packet 0. Thus, cluster 0 is launched while it is partially allocated, or equivalently, partially idle. That is, after cluster 0 is launched, only one of its four engines will be in a processing state and the remaining three will be idle. The remainder of entries in Row 616 show the progress time of the parsing, measured from the launch time. In particular, Row 616 shows that cluster 0 parses packet 0 between times 0 and 40. This time period is marked as the first round of parsing for cluster 0.

Row 617 indicates that packet 1, upon its arrival at time 5, is allocated to cluster 1, which is launched at the same time to parse packet 1. Cluster 1, therefore, is also launched while being partially allocated; only one of its engines will be in a processing state and the remaining three will be idle. Row 617 shows that cluster 1 parses packet 1 between times 5 and 45. This time period is marked as the first round of parsing for cluster 1.

Returning to row 614, it shows that packets 2-8 arrive between times 10 and 40. These packets, however, cannot be parsed during this time period, because during this time both clusters of the parser are in the processing state and thus no clusters are available to parse a new packet. Upon their arrival, therefore, packets 2-8 are stored for later parsing.

Row 616 shows that at time 40 cluster 0 completes its first round of parsing, during which it parses packet 0. At time 45, therefore, cluster 0 becomes idle. Row 618 shows that at time 45 the system selects packets 2-5 of the already received packets and allocates them to the now idle cluster 0. In some embodiments, the system allocates packets 2-5 to the four engines that are in cluster 0. Also, upon this allocation, the system launches cluster 0 to parse packets 2-5. Thus, row 618 shows that at time 45 cluster 0 is launched after being fully allocated, that is, after all its four engines are allocated. The four engines of cluster 0 parse the four allocated packets in parallel between times 45 and 85. This time period is marked as the second round of parsing for cluster 0. At the start of this round, that is, time 45, packets 6-9 have already arrived, but cannot be parsed as no other idle cluster is available.

Row 617, however, shows that at time 50 cluster 1 becomes idle, having completed parsing of packet 1 in its first round of parsing at time 45. Row 619 shows that at time 50 the system allocates packets 6-9 to the now idle cluster 1. In some embodiments, the system allocates packets 6-9 to the four engines in cluster 1. Also, upon this allocation, the system launches cluster 1 to parse packets 6-9. Thus, at time 50, cluster 1 is launched after being fully allocated, that is, after all its four engines are allocated. The four engines of cluster 1 parse the four allocated packets in parallel between times 50 and 90. This time period is marked as the second round of parsing for cluster 1. The above alternation may continue, during which more packets arrive regularly, are allocated to a cluster when it becomes idle, and are parsed by that cluster.

Summary table 620 of chart 600 includes rows 622 and 625-628, which summarize some of the data from timeline table 610. In particular, row 622 includes column headers. In particular, column headers show that each of rows 625-628 lists, for one of the packets, its packet number, arrival time, start time, complete time, and latency. The arrival time is the time that a packet arrives at the parser, as listed in row 614. The start time is when a cluster starts parsing the packet and the complete time is when that parsing ends. The latency is the time difference between the arrival and the completion times.

Row 625, for example, shows that packet 0 arrived at time 0, as also listed in row 614; started to be parsed at time 0 (by cluster 0), as listed in row 616; its parsing completed at time 40, as also listed in row 616; and its latency was 40, which is the difference between its completion time of 40 and its arrival time of 0. Similarly, row 626 shows that packet 1 arrived at time 5, as listed in row 614; started to be parsed at time 5 (by cluster 1), as listed in row 617; its parsing completed at time 45, as also listed in row 617; and its latency was 40, which is the difference between its completion time of 45 and arrival time of 5.

Row 627, on the other hand, shows that packet 2 arrived at time 10, as listed in row 614; started to be parsed at time 45 (by cluster 0), as listed in row 618; its parsing completed at time 85, as also listed in row 618; and its latency was 75, which is the difference between its completion time of 85 and arrival time of 10. Similarly, row 628 shows that packet 3 arrived at time 15, as listed in row 614; started to be parsed at time 45 (by cluster 0), as listed in row 618; its parsing completed at time 85, as also listed in row 618; and its latency was 70, which is the difference between its completion time of 85 and arrival time of 15. The remaining rows in table 620 list similar data for packets 4-12.

Subsection 630 of table 620 summarizes the latency data for packets 0-12. In particular, subsection 630 shows that the maximum latency was 80 (in this case corresponding to packet 10) and the average latency for packets 0-12 was 60.4. In various embodiments, the average latency can be a measure of the efficiency of the parser. A parser may become more efficient if it can reduce the average latency of packets, thus in the average parsing the packets faster.

Figure 7:
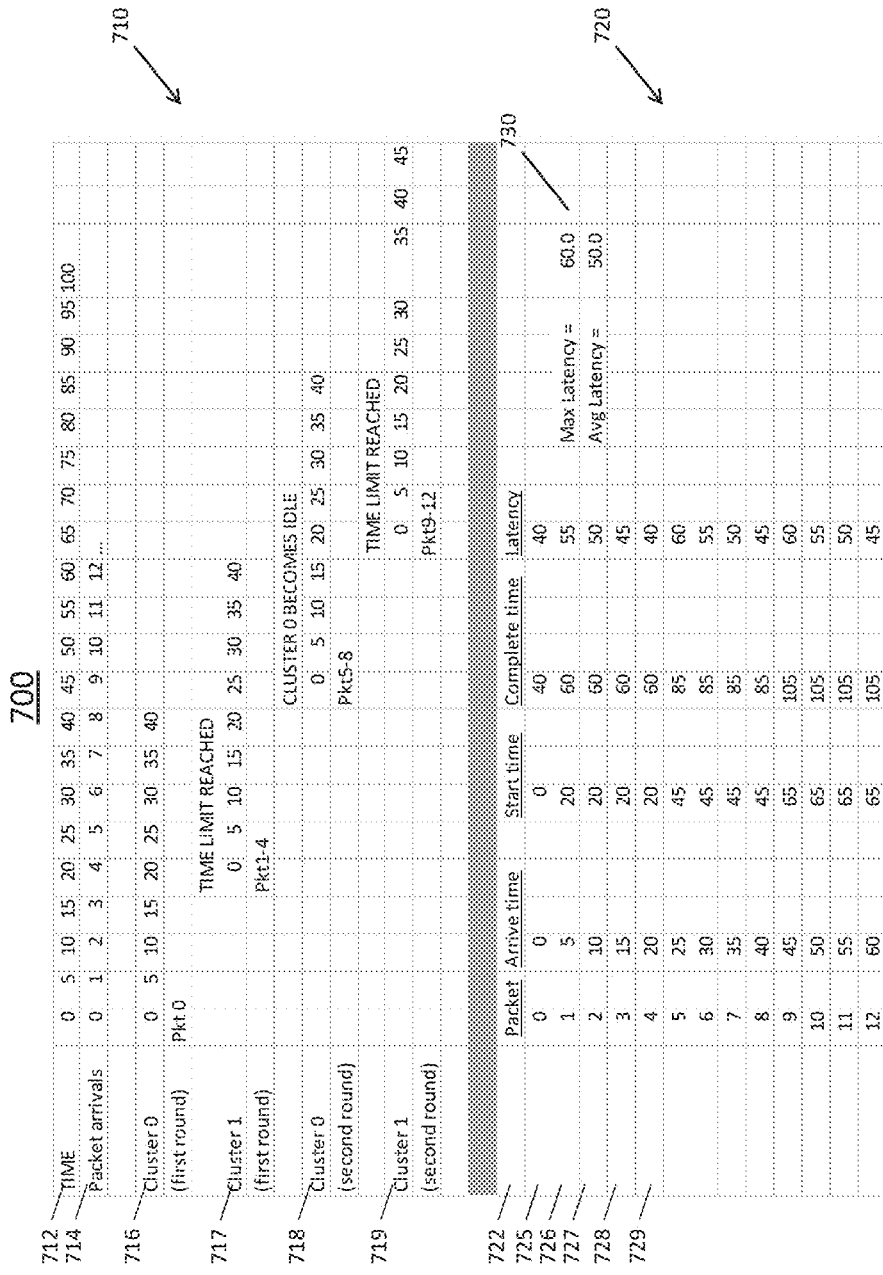
FIG. 7 shows a chart illustrating distribution of packets between two clusters and launching those clusters according to another embodiment.

In the embodiment of FIG. 6, as soon as a cluster becomes idle it is allocated with already arrived packets up to its capacity and immediately launched. Such an arrangement may result in some clusters being launched while being partially allocated or even minimally allocated, as happened above in the first rounds of parsing of both clusters. These situations may increase the latency of some packets and reduce the overall efficiency of the parser Some embodiments allocate and launch the clusters in a manner that increases the average allocated engines of a launched cluster. In some embodiments, such an increase results in an increased efficiency for the parser. In some embodiments, the launcher increases the efficiency by balancing between launching the candidate cluster as soon as possible and filling the candidate cluster as close to its full capacity as possible before launching it. FIG. 7 shows a chart 700 illustrating distribution of packets between two clusters and launching those clusters according to one such embodiment. In FIG. 7, also, each of the two clusters include four engines and both are assumed to be fully idle at the start.

Chart 700 includes a timeline table 710 at the top and a summary table 720 at the bottom. Timeline table 710 details an illustrative timeline for parsing thirteen packets as they sequentially arrive at a parser that includes two clusters, indicated as clusters 0 and 1. Table 710 includes rows 712, 714, and 716-719. Row 712 indicates the timeline measured from the arrival of the first packet (labeled as packet 0) and in some arbitrary unit of time. Row 714 indicates that the thirteen packets, indexed packets 0 to 12, arrive at the parser in interval of 5 units. In the example of FIG. 7, also, each engine takes 40 time units to parse a packet.

Row 716 indicates that at time 0 packet 0 arrives and is allocated to cluster 0; and that cluster 0 is also launched at time 0 to parse packet 0. Thus, cluster 0 is launched while only one of its four engines will be in a processing state and the remaining three will be idle. Row 716 shows that cluster 0 parses packet 0 between times 0 and 40. This time period is marked as the first round of parsing for cluster 0.

Row 717 indicates that packets 1-4, which arrive between times 5 and 20, are not processed till time 20. In particular, in this embodiment, the launcher does not launch cluster 1 until a time delay limit is reached. The launcher may start a timer when one of the clusters is launched and the launcher may launch the next allocated cluster when the timer reaches the time delay limit. In some embodiments, the time delay limit is a preset time duration. The time delay limit may be a function of one or more variables in the system. The time delay limit may be a function of the average duration of one round of parsing by a cluster, that is, the average time that a cluster takes to parse one or more packets that are allocated to it. In some embodiments, the time delay limit is a fraction of that average duration. The fraction may be 1/n, where n is the number of clusters.

In some embodiments a parser includes n clusters, wherein n is an integer greater or equal to 2. In some of these embodiments, when all clusters are idle, the first cluster is launched as soon as one or more packets arrive and are allocated to the first cluster. The rest of the clusters are then launched either based on the timer condition explained above or whenever they are fully allocated. In some other embodiments, the timer condition is applied when launching the i'th cluster, where i is any number less than or equal to n. In some embodiments, the timer condition is applied for all clusters for which the index is greater than or equal to k, where k is any number between 1 and n. The number k may be equal to the number n, that is, the timer condition is applied only for launching the last idle cluster. In some embodiments, the index i of a cluster is based on the order in which the launcher selects that cluster as the candidate cluster. In various embodiments, this order is random, or based on when a cluster becomes idle. The index i of a cluster, therefore, may change from one round of launching the cluster to the next round of launching the same cluster.

In the example of FIG. 7, the time delay limit is set to 20, which is the parsing time of 40 divided by 2, the number of clusters. Thus, row 717 shows that cluster 1 is launched at 20, which is 20 time units after cluster 0 is launched at time 0. By time 20, packets 1-4 have already arrived and been stored for parsing. These packets are thus allocated to cluster 1. Upon being launched at 20, therefore, cluster 1 is fully allocated. Row 717 also shows that cluster 1 parses packets 1-4 between times 20 and 60. This time period is marked as the first round of parsing for cluster 1.

Row 716 shows that at time 45 cluster 0 completes its first round of parsing packet 0 and becomes idle. Row 718 shows that at time 45 the system selects packets 5-8 of the already received packets and allocates them to the now idle cluster 0 and launches the fully allocated cluster 0 to parse those packets. The four engines of cluster 0 parse these four packets 5-8 in parallel and between times 45 and 85. This time period is marked as the second round of parsing for cluster 0. Upon starting cluster 0 at time 45, the system also restarts the timer.

Row 717 shows that at time 60 cluster 1 completes its first round of parsing and becomes idle afterwards. Moreover, at time 65, the timer reaches the time delay limit of 20. Thus at this time, the launcher allocates to idle cluster 1 packets that have already arrived, up to the capacity of cluster 1. In FIG. 7, at time 65 the launcher allocates to cluster 1 packets 9-12, thus rendering cluster 1 to fully allocated. Further, at time 65, the launcher launches the fully allocated cluster 1 for its second round of parsing.

The above alternation may continue, during which more packets arrive regularly and are allocated to an idle cluster. In different cases, the idle cluster is launched as soon as one or more packets are allocated to it, when it is fully allocated, or when the timer reaches a time delay limit.

Summary table 720 of chart 700 summarizes some of the data from timeline table 710. Row 725, for example, shows that packet 0 arrived at time 0, started to be parsed at time 0 (by cluster 0), its parsing completed at time 40, and its latency was 40, which is the difference between its completion time of 40 and its arrival time of 0.

Rows 726-729, on the other hand, show that packets 1-4 arrive between times 5 and 20, all started to be parsed at time 20 (by cluster 1); and their parsing completed at time 60. The latency times for packets 1-4 are thus, respectively, 55, 50, 45, and 40.

Subsection 730 of table 720 summarizes the latency data for packets 0-12. In particular, subsection 730 shows that the maximum latency was 60 (in this case corresponding to packets 5 and 9) and the average latency for packets 0-12 is 50, which is lower than the average latency for the packets in FIG. 6. Thus, the use of the timer mechanism in FIG. 7 has increased the efficiency of the parser. In the above explanations for FIGS. 6 and 7, the latency times for some operations such as allocation or launching have been considered negligible. In some embodiments, these latencies may also be taken in to account in the process.

Figure 8:
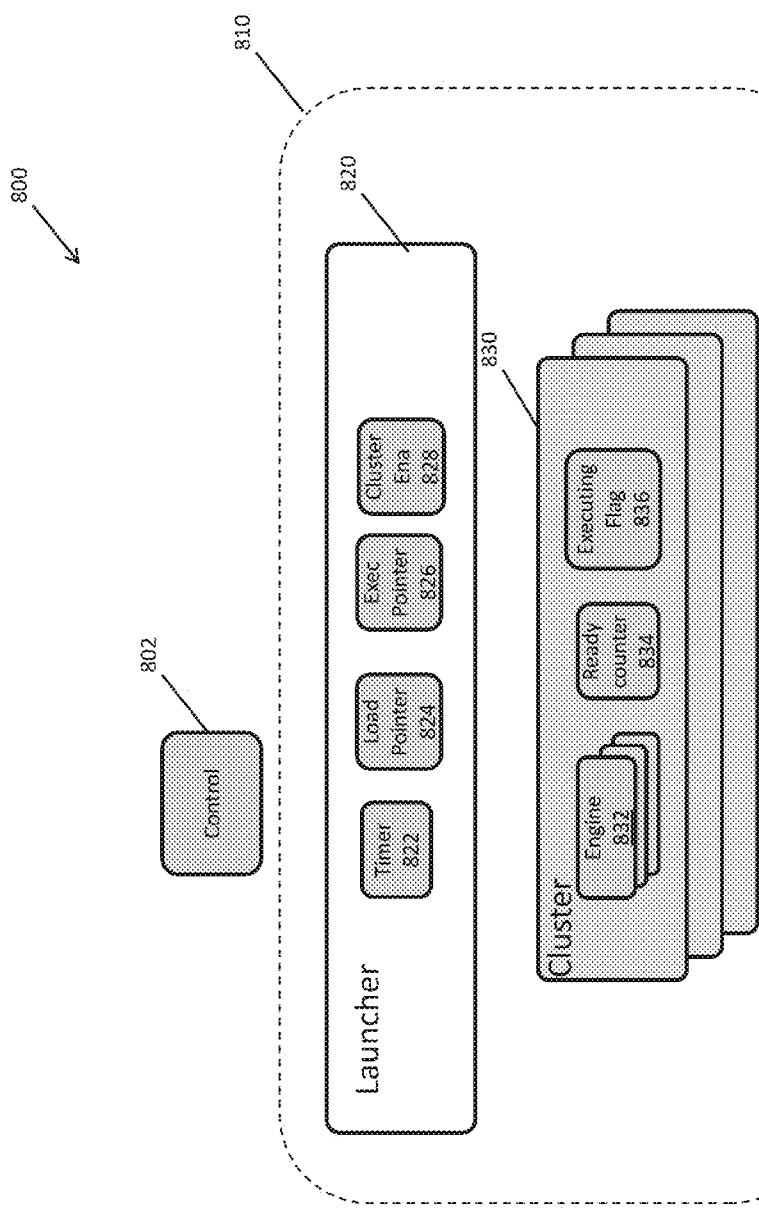
FIG. 8 is a block diagram of a parser that includes a launcher mechanism according to some embodiments.

In some embodiments, the launcher mechanism is included in one or more sections of the parser. FIG. 8 is a block diagram of a parser 800 that includes such a launcher mechanism according to some embodiments. Parser 800 includes a control module 802, and one or more Instruction Cluster Groups (ICGs) 810. ICG 810 includes a launcher module 820, and one or more clusters 830. In some embodiments, each cluster 830 includes one or more engines 832, which perform the same set of instructions for parsing packets. In some embodiments, an ICG includes a communication mechanism among its engines, for the engines to coordinate usage of shared resources. These mechanisms may be used, for example, to implement policing or statistics common across multiple packets.

In various embodiments, control module 802 controls distribution of packets among different ICGs, clusters, or engines, in the manner described herein. In various embodiments, launcher module 820 distributes packets among the clusters and launches those clusters. Launcher module 820 includes a timer module 822, a load pointer 824, an execution pointer 826, and a cluster enable mask 828. Timer 822 measures an elapsed time with respect to an event, such as launching a cluster. At each time, load pointer 824 points to the candidate cluster, also called the current candidate cluster. The launcher may use this pointer when attempting to allocate packets to the current candidate cluster. In some embodiments, load pointer 824 points in a round robin manner to the clusters in an ICG as listed in a sorted list. At any time, the two clusters that respectively precede and follow the current candidate cluster in the list may be called previous and next candidate clusters, respectively.

Moreover, at each time, execution pointer 826 points to a cluster that should be launched. In some embodiments, execution pointer 826 points to a current candidate cluster, or a previous candidate cluster that is allocated but not processing. Cluster enable mask 828 is a bit-mask indicating the clusters which can service this ICG. In some embodiments, when the launcher allocates a new cluster as, e.g., a candidate cluster, the launcher finds the next set bit in this bit mask and changes the ICG's current loading cluster number.

Cluster 830 includes one or more engines 832, a ready counter 834, and an executing flag 836. During a parsing round of a cluster, each of its engines may receive and parse data for one packet. In various embodiments, a cluster in an ICG functions as an SIMD unit; during a round of parsing, the cluster provides a single stream of parsing instructions to its multiple engines, each of which uses the instruction stream to parse the data for a packet that is allocated to it. Ready counter 832 indicates the number of idle engines in cluster 830. Executing flag 836 indicates whether or not the cluster is executing, that is, is in the processing state. If this flag indicates that the cluster is not executing, the cluster may be in an idle state (if ready counter 834 is non-zero) or in a fully allocated state (if ready counter 834 is zero).

In various embodiments, the launcher of an ICG applies an algorithm to allocate and parse packets. In some embodiments, a requesting entity indicates that it has a new data stream, including packet data, ready to be executed upon. The request may indicate a candidate ICG that can parse the packets. This candidate ICG may by an ICG that carries the instructions associated with the type of parsing suited for the packets. The launcher of the candidate ICG uses the load pointer to determine a current candidate cluster on which to load the packets. If the current candidate cluster is fully allocated, i.e., its ready counter is zero, or its executing flag indicates that the candidate cluster is executing, then the launcher uses the cluster enable mask to select the next candidate cluster. In some embodiments, the launcher checks whether the next candidate cluster is idle, that is, neither fully allocated nor processing. Otherwise, the launcher searches for an idle cluster and designates it as the candidate cluster. If no idle cluster exists, the launcher launches the next candidate cluster, if not already processing, and waits for the next candidate cluster to complete its parsing round. Alternatively, if the next candidate cluster is idle, the launcher may allocate one or more packets to one or more idle engines in the candidate cluster. Upon doing so, the launcher decrements the ready counter in the candidate cluster by the number of packets that are allocated to that cluster.

Figure 9A:
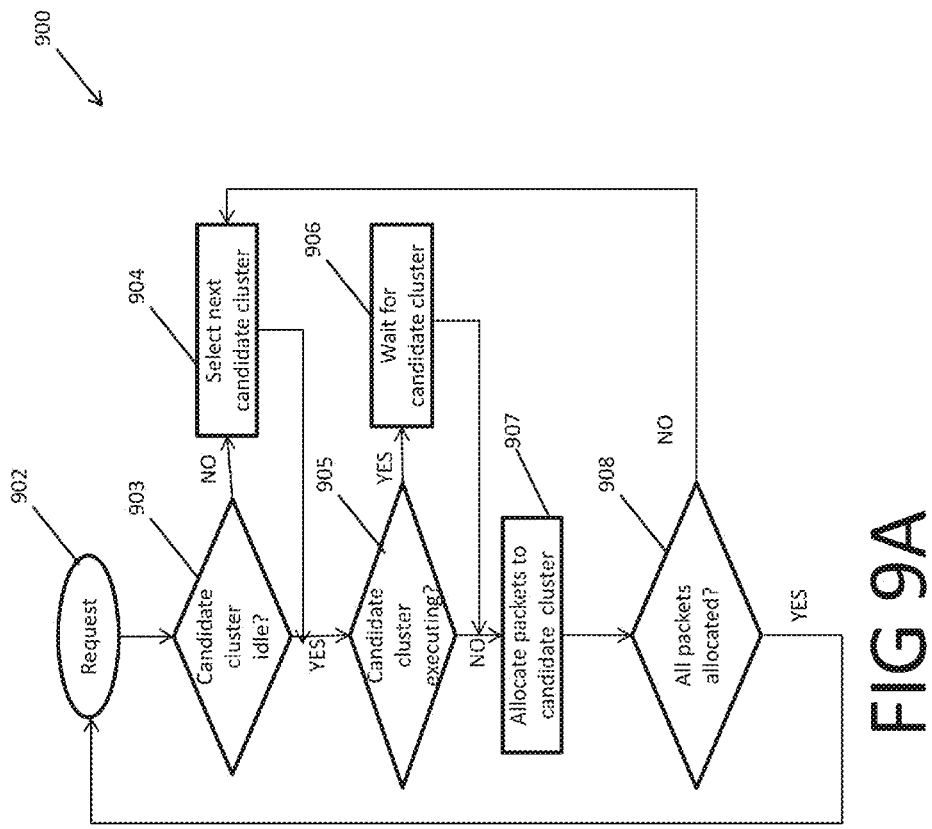
FIGS. 9A and 9B show two flowcharts for distribution of packets and launching clusters according to some embodiments.
Figure 9B:
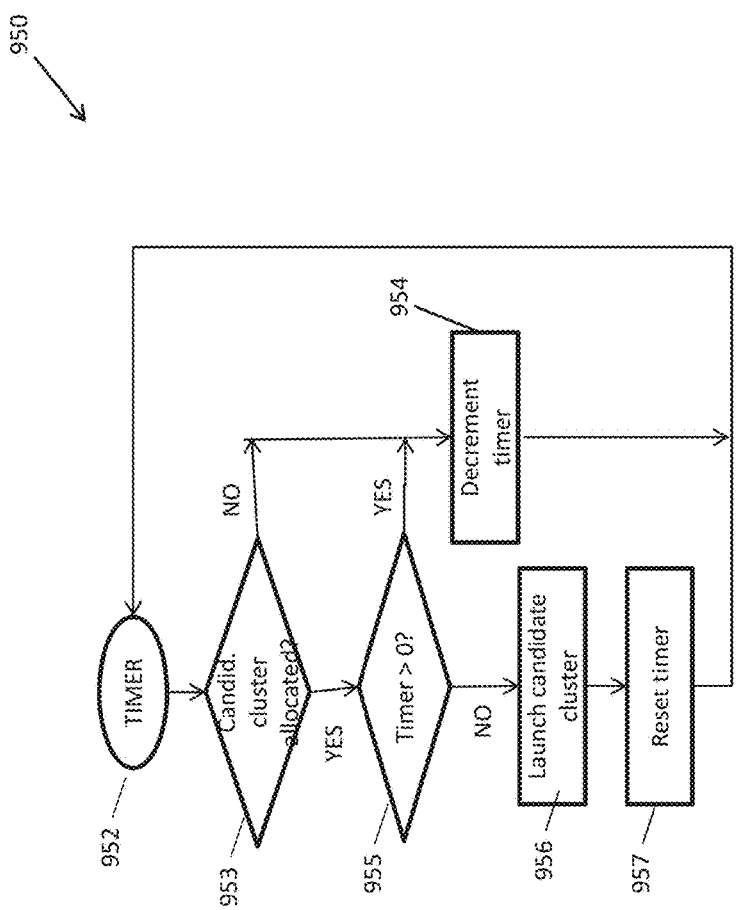

FIGS. 9A and 9B show flowcharts 900 and 950 for distribution of packets and launching clusters according to some embodiments. In various embodiments, one or more of flowcharts 900 and 950 are performed by one or more sub-modules in an ICG or a launcher in an ICG.

Flowchart 900 of FIG. 9A shows steps for allocating packets to engines in clusters. In block 902, the ICG receives a request, including one or more packet data to be parsed. In decision block 903, the launcher of the ICG checks whether the candidate cluster is idle. In some embodiments, the launcher has at any time one of the clusters in the ICG designated as the candidate cluster. If the candidate cluster is not idle (decision block 903: NO), the launcher selects the next candidate cluster as the candidate cluster in block 904. In some embodiments, the launcher does so by pointing the load pointer to the next candidate cluster. In some embodiments, the launcher selects the candidate clusters for allocation and launches them in a round robin manner; and each cluster takes about the same time to complete a round of parsing. In such embodiments, if the next candidate cluster is not idle, no other cluster can be idle. In alternative embodiments, in block 904, the launcher selects as the next candidate cluster an idle cluster or, if none of the clusters is idle, a cluster that was launched before other clusters.

If the candidate cluster is idle (decision block 903: YES) or, otherwise, after selecting the next candidate cluster as the candidate cluster (block 904), the launcher checks whether the candidate cluster is executing, i.e., is in the processing state (decision block 905). If the candidate cluster is executing (decision block 905: YES), then in block 906 the launcher waits for the candidate cluster to complete its round of parsing and thus become idle. In some embodiments, if the candidate cluster is executing, then no other cluster in the ICG can be idle. Moreover, in some embodiments, this candidate cluster is selected such that it will be the first cluster that will become idle.

If the candidate cluster is not executing (decision block 905: NO), or alternatively after the executing candidate cluster completes its round of parsing and thus becomes idle (i.e., after completion of block 906), in block 907 the launcher allocates one or more non-allocated packets of the request to the candidate cluster. In some embodiments, the launcher sequentially allocates packets in the request to the candidate cluster unless, or up to the point that, the candidate cluster becomes fully allocated. In some embodiments, once the candidate cluster is fully allocated, the load pointer is changed to point to the next candidate cluster. In some embodiments, this change includes finding the next set bit in the cluster enable mask.

In decision block 908, the launcher checks whether all packets in the request have been allocated to engines in the candidate clusters. If that is not the case (decision block 908: NO), the candidate cluster must have been fully allocated before all packets have been allocated. In this case, the launcher circles back to block 904 to select a new candidate cluster and proceeds with allocating the remaining packets to the new candidate cluster in the manner explained above. Otherwise, if all packets have been allocated (decision block 908: YES), the launcher circles back to block 902 and waits for the next request. In some embodiments, if the candidate cluster becomes fully allocated in block 907, the launcher launches the candidate cluster. In some embodiment, the launcher launches the candidate cluster after a delay time is reached.

Flowchart 950 of FIG. 9B shows steps for launching clusters based on one or more criteria. In various embodiments the criteria include whether the candidate cluster is allocated, fully allocated, or a time delay has passed since last launch. In some embodiments, the timer measures the time delay since last launch. In some embodiments, the timer is reset to a preset time delay limit when a cluster launches, and then the timer counts down the time till it reaches zero.

In the embodiment shown in FIG. 9B, at 952 the timer triggers one cycle of the steps shown in flowchart 950. Timer 952 may trigger such a cycle in every unit of time or at specific intervals.

At decision block 953, the launcher checks whether the candidate cluster is allocated. If the candidate cluster is not allocated, i.e., is fully idle (decision block 953: NO), the timer is decremented in block 954 and the cycle ends by returning to timer at 952. The timer may be decremented by one unit of time, if the cycle is triggered every unit of time. Alternatively, the timer may be decremented by other amounts, such as the interval between this cycle and the previous cycle, as also stored in the timer.

Alternatively, if the candidate cluster is allocated (decision block 953: YES), in decision block 955 the launcher checks whether the timer is still positive. A positive value of the timer indicates that the time delay limit has not yet reached. In such a case (decision block 955: YES), the timer is decremented in block 954 and the cycle ends by returning to timer at 952.

If the time is not positive, that is, if the time delay limit has been reached or passed, in block 956 the launcher launches the candidate cluster and in block 957 it resets the timer to the preset time delay limit.

In the above embodiment, the candidate cluster is launched if it is at least partially allocated and if the preset time delay has reached since the last launch. In some embodiments, decision block 955 includes one or more other criteria that could also trigger launching the candidate cluster in block 956 (followed by resetting the time in block 957). In some embodiments, these criteria relate the number of idle clusters (which includes the candidate cluster). For example, in some embodiments, the launcher launches the candidate cluster if the number of idle clusters exceeds k, where k is a number less than n, the total number of clusters. The number k may be 1, indicating that the timer mechanism is only applied when the candidate cluster is the last idle cluster; otherwise, the candidate is launched if it is at least partially allocated. Alternatively, the number k may be n−1, indicating that when all clusters are idle, the candidate cluster is launched as soon as allocated; but otherwise the candidate cluster is launched based on the time delay limit criterion. Alternatively, the number k may be a number between 1 and n−1. The number k may be set based on other criteria, which may include the speed by which the packets arrive, the number of clusters, the number of engines in the clusters, or the average parsing time.

In some other embodiments, the criteria in decision block 955 include whether the candidate cluster is fully allocated. In some embodiments, a fully allocated cluster is launched, and the timer is reset, regardless of whether the time delay limit has been reached.

In some embodiments, when the candidate cluster is launched, its state is changed to processing. Moreover, the launcher's execution pointer is changed to point to the next candidate cluster. In some embodiments, this change includes finding the next set bit in the cluster enable mask.

Figure 10:
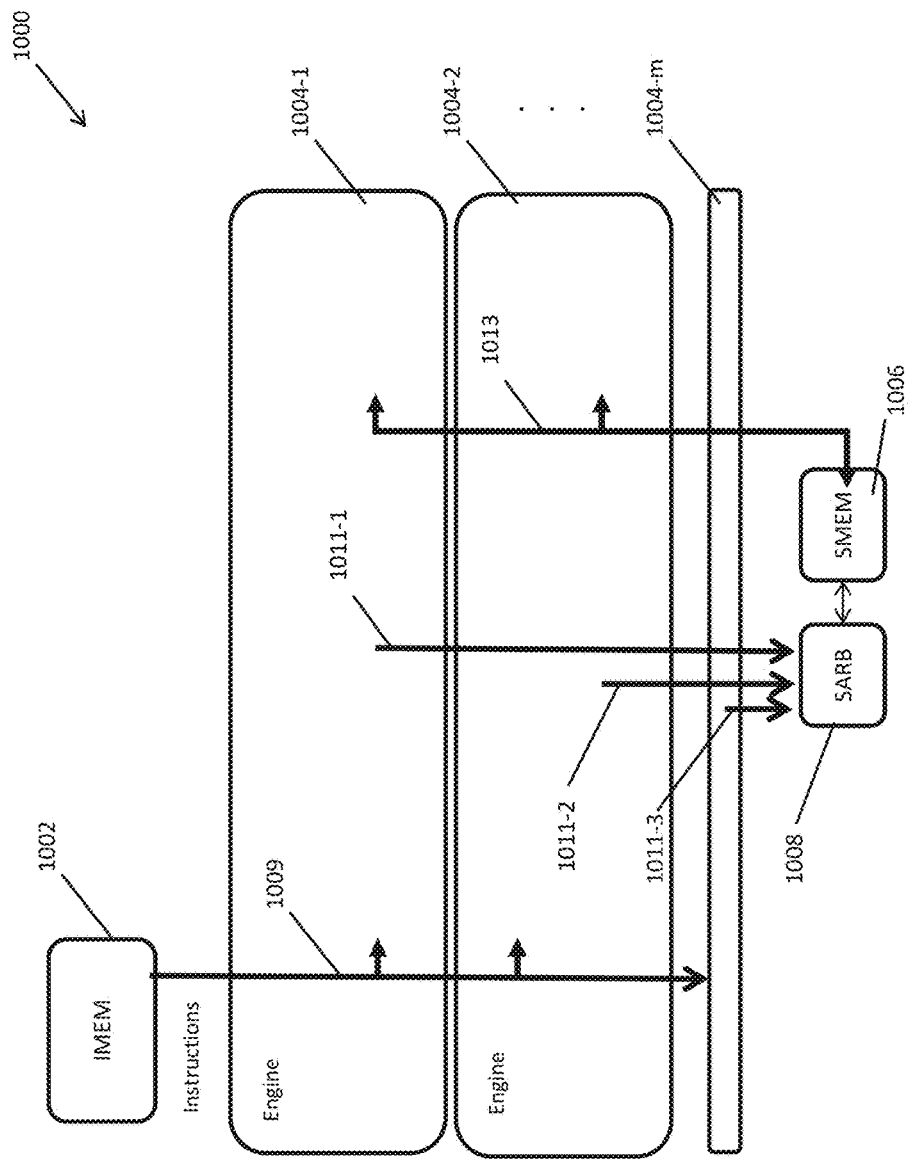
FIG. 10 is block diagram of a SIMD packet parsing mechanism according to some embodiments.

In some embodiments, a SIMD architecture enables efficient execution of similar steps against multiple portions of data simultaneously. In some embodiments, in a SIMD architecture the similar steps are steps of a parsing process and the multiple data correspond to the data for multiple packets. FIG. 10 is block diagram of a SIMD packet parsing mechanism 1000 according to some embodiments. In some embodiments, mechanism 1000 is included in a packet parser or a cluster in a packet parser.

SIMD mechanism 1000 includes an IMEM 1002, two or more engines 1004 (FIG. 10 shows m engines indexed as 1004-1 to 1004-m), shared memory SMEM 1006, and memory arbiter SARB 1008. IMEM 1002 is configured to transmit a common instruction stream 1009 to engines 1004-1 to 1004-n. Engines 1004 are configured to execute the instructions to, for example, parse the packets. SMEM 1006 is a memory that is shared among engines 1004-1 to 1004-m. SMEM 1006 may be configured to store information that are input for some of the instructions that the engines execute, and thus the engines need to read that information from SMEM 1006. Further, SMEM 1006 may be configured to store some of the results that the engines output while executing those instructions, and thus the engines need to write that information to SMEM 1006. SARB 1008 is configured to arbitrate the use of SMEM 1006 among different engines 1004. In some embodiments, IMEM 1002 is a shared instruction memory allocated to a parser, an ICG, a cluster, or a group of engines. Further, in some embodiments, engines 1004, SMEM 1006, and SARB 1008 are sections included in a cluster. In some embodiments, system 1000 is a SIMD machine formed of a group of engines that do not belong to a cluster.

In some embodiments, engines 1004 belong to a cluster of a parser. During a parsing round, when a cluster parses two or more packets allocated to its engines, IMEM 1002 may transmit a single instruction stream 1009 to engines 1004-1 to 1004-m. The engines each receive and execute the instructions. Based on some of the instructions, an engine may request an access SMEM 1006 for a read or write operation. Such access requests 1011 are send by each engine 1004 to SARB 1008. In particular, engine 1004-1 may send a request 1011-1, engine 1004-2 may send another request 1011-2 and so on. SARB 1008 accordingly enables SMEM 1006 to service the read or write requests of the engines via responses 1013.

Requests 1011 from different engines may arrive at SARB 1008 at various times. In some cases, two or more requests from different engines may arrive at SARB 1008 at the same time. In such cases, SARB 1008 may delay response 1013 to some of the simultaneous requests, such that SMEM 1006 services the simultaneous requests one at a time. In some embodiments, such delays may cause different engines to have different execution time for parsing packets.

In some embodiments, a SIMD architecture includes mechanisms to reduce simultaneous requests to the shared memory. Avoiding simultaneous requests may enable the parsing sequence to be more deterministic and may avoid unequal execution times for different engines. FIG. 11 shows a chart 1100 illustrating execution of an instruction stream in a cluster with a SIMD architecture according to some embodiments. In particular, FIG. 11 corresponds to a cluster that includes five engines (indexed engines 0 to 4). Chart 1100 includes rows 1102 to 1117, showing the sequence of instructions executed by each engine from different points of view.

Row 1102 shows that an instruction stream, sent to the engines, includes thirteen consecutive steps, indexed as steps i to xiii. In this example, each step takes one time cycle. Row 1103 shows the type of these thirteen steps with regards to accessing the SMEM. In particular, steps iii and ix, identified as SMEM, require accessing the shared SMEM memory. These steps may include reading some data from the SMEM or writing some data into the SMEM. The remainder of the shown thirteen steps, identified by X, do not require access to the SMEM. These steps may include operations such as calculations based on the packet data that is read into the corresponding engine or data that are already read from the SMEM.

Rows 1104-1109 show the index of instruction executed by each engine at each time cycle. In particular, row 1104 is a time line row, dividing the time into 17 time cycles, listed as times 1 to 17. Rows 1105 to 1109 identify, by their indexes, the instruction executed by each of engines 0 to 4 at teach time cycle. As seen in these rows, each engine receives the instructions of row 1102 and executes them in the same order. Each of engines 1 to 4, however, delays execution of each instruction by one time cycle compared to the previous engine. Row 1105, for examples, shows that engine 0 executes instruction i at time cycle 1, instruction ii at time cycle 2, and so on. Row 1106, on the other hand, shows that engine 1 starts execution of the instructions by executing instruction i at time cycle 2, and continues to executing instruction ii at time cycle 3, instruction iii at time cycle 4, and so on. In the same manner, rows 1107-1109 show that engines 2 to 4 start executing the stream of instructions at time cycles 3, 4, and 5, respectively.

Rows 1110-1115 show the type of instruction executed by each engine at each time cycle. In particular, row 1110 is a time line row identical to time line row 1104. Rows 1111 to 1115 show the type of the instruction executed by each of engines 0 to 4. The type of the instruction corresponds to whether the instruction does or does not require access to SMEM, in the manner shown in row 1103. Each row can be derived by mapping the instruction indexes in the corresponding engine from rows 1105-1109 to instruction types shown in row 1003. Row 1111, for example, can be derived from row 1105. Row 1111, thus, shows that engine 0 executes requires accessing SMEM at time cycles 3 and 9, because, according to row 1105, this engine executes at these cycles SMEM related instructions iii and ix. Moreover, row 1111 shows that in time cycles 1, 2, 4-8, and 10-13, engine 0 executes instructions that do not require accessing SMEM. Similarly, row 1112 shows that engine 1 executes SMEM accessing instructions only at time cycles 4 and 10 of the first 14 cycles. Similarly, engines 1113-1115 show that engines 2, 3, and 4 execute SMEM accessing instructions at time cycle pairs 5 and 11; 6 and 12; and 7 and 13, respectively.

In the embodiment shown in FIG. 11, thus different steps of instructions are straddled among different engines by introducing delays in starting the execution of instruction stream. The straddling causes each SMEM accessing instruction to be executing at different times by different engines. This result is more clearly shown in rows 1116 and 1117. Rows 1116 and 1117 show which engine accesses the SMEM at which time cycles, as derived from rows 1111-1115. In particular, row 1116 is a time line row identical to time line rows 1104 or 1110. Row 1117 shows the engine that accesses the SMEM in each time cycle. For example, row 1117 shows that the SMEM is idle at time cycles 1 and 2. At time cycle 3, on the other hand, SMEM is accessed by engine 0 only, which executes SMEM accessing instruction iii at this time. These events can be derived from the columns for time cycles 1 to 3 in rows 1111-1115. Similarly, rows 1116 and 1117 show that at time cycles 4-7, SMEM is accessed by engines 1-4, respectively, each of which execute SMEM accessing instruction iii at the corresponding time cycle. At time cycle 8 SMEM is idle and is not accessed by any engine. At time cycle 9, on the other hand, SMEM is once again accessed by engine 0, this time for executing instruction ix. At this time, no other engine executes either of SMEM accessing instructions iii or ix. Similarly, at time cycles 10-13, SMEM is accessed by engines 1-4, respectively, for executing SMEM accessing instruction ix.

Row 1117 thus shows that no two engines try to access SMEM at the same time. In some embodiments, this result is achieved by introducing the delays in the instruction streams in each engine compared to the previous engine, as explained above. This straddling causes that no two engines perform at the same time an SMEM accessing instruction such as instruction iii or instruction ix. Further, the result depends on that the SMEM instructions iii and ix are far enough such that once an engine reaches instruction ix, all other engines have already completed instruction iii.

In various embodiments, one or more engines add some delays to the instruction stream, such that no two engines perform the same instruction at the same time. Moreover, in some embodiments, the instruction stream is designed such that the SMEM accessing instructions are separated by enough time cycles to achieve the above mechanism. In particular, in some embodiments, each new SMEM accessing instruction of one engine in the instruction stream in separated from the previous SMEM accessing instruction by an interval that is not smaller than the time that takes the other engines execute the intervening SMEM accessing instructions. In some embodiments, this interval is equal or larger than the number of the remaining engines times the time that it takes each engine to perform an SMEM accessing instruction. In FIG. 11, for example, SMEM accessing instruction ix is separated from the previous SMEM accessing instruction iii by five time cycles (time cycles 4 to 8 in row 1103). After engine 0 completes instruction iii, the five time cycle interval for engine 0 suffices for the remaining four engines 1-4 to complete instruction iii. Alternatively, after engine 1 completes instruction iii, this five time cycle interval for engine 1 suffices for the three engines 2-4 to complete instruction iii and for engine 0 to complete instruction ix. Thus, in some embodiments, different instructions take the same amount of time. Two SMEM accessing instruction may then be separated by an interval that is equal to or larger than the number of engines time the amount of time for execution of one instruction.

Figure 12:
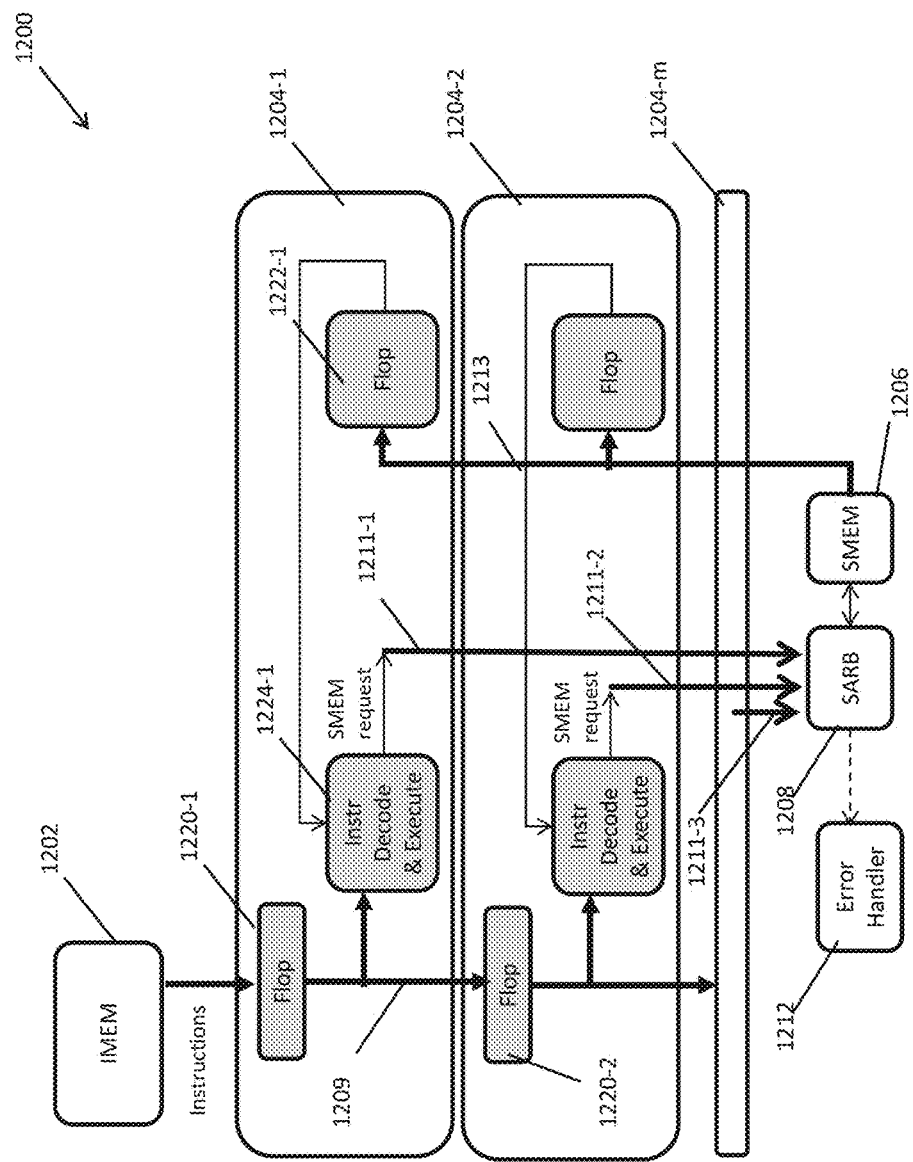
FIG. 12 is a block diagram of a SIMD packet parsing mechanism according to an embodiment.

In some embodiments, a SIMD mechanism implements the above-discussed delay mechanism. FIG. 12 is a block diagram of a SIMD packet parsing mechanism 1200 according to one such embodiment. In various embodiments, SIMD packet parsing mechanism 1200 is included in a packet parser or a cluster in a packet parser. In some embodiments, mechanism 1200 may utilize a form of time division multiplexing that relies on sequential execution of each instruction in a pipelined manner.

SIMD mechanism 1200 includes an IMEM 1202, two or more engines 1204 (FIG. 12 shows m engines indexed as 1204-1 to 1204-m), shared memory SMEM 1206 and memory arbiter SARB 1208. Mechanism 1200 also include error handler module 1212. Moreover, each engine 1204 includes flops 1220 and 1222, and instruction decoder-executor module 1224. The index number of the engine may depend on the order they have been connected on various busses such as those for data streams 1209 or 1213. Alternatively, in some embodiments, the indexes of the engines are arbitrary and may change from one parsing cycle to the next.

In SIMD mechanism 1200, the engines receive instruction stream 1209 sequentially, each through its flop 1220. In particular, the first engine (here 1204-1) receives the instructions from IMEM 1202 through flop 1220-1, the second engine 1204-2 receives the instructions from flop 1220-1 of the first engine through its own flop 1220-2, and so on. Upon receiving the instructions, flop 1220 of each engine adds a delay to the instruction. In some embodiments, these delays correspond to the delay among execution of instructions among rows 1104-1109 of FIG. 11. In some embodiments, such as that of FIG. 11, the first engine (engine 0 in FIG. 11) does not introduce the delay. In some other embodiments, such as that shown in FIG. 12, all engines include similar flops that similarly introduce the delay. Each engine thus may execute an instruction one cycle delayed from the previous engine.

The instructions are then transmitted to module 1224 of the engine, which decodes and executes the instruction. In some embodiments, module 1224 of different engines introduce the same amount of latency into the process. If the instruction requires accessing SMEM 1206, module 1224 sends an SMEM request 1211 to SARB 1208. SARB 1208 combines the requests to SMEM 1206. In some embodiments, based on the mechanism explained in FIG. 11, SMEM accessing requests arrive at different times and SARB 1208 can transmit every request directly to SMEM 1206. In some embodiments, therefore, SARB is an OR gate that combines and transmits to SMEM 1296 all requests that it receives from different engines. Alternatively, in some embodiments, if two engines send SMEM accessing requests at the same time, SARB 1206 reports this conflict to error handler 1012, for the error handler module to handle the error. The error handling may include a diagnosis at a higher level software.

SMEM 1206 receives the requests, acts on them, and transmits the results to flop 1222 of the engine through request response 1213. In some embodiments, if request 1211 includes reading a data, then response 1213 includes the requested data. If, on the other hand, request 1211 includes writing some data, then response 1213 includes a memory address in SMEM for writing that data. Because the requests and their responses are time-multiplexed, response 1213 may be a single stream bus servicing all engines.

Flop 1222 may store or transmit the data included in response 1213 to module 1224 for further processing. In some embodiments, flop 1222 of the engine includes flop 416 shown in FIG. 4. Each engine stores the results of its request and uses it to perform whatever additional operations the instruction required.

The above discussed features and structures enable parsers that have a high efficiency as compared to their cost and size. Various embodiments implement mechanisms that result in fixed or deterministic packet parsing times. That is, once the packets are allocated to engines, it can be predicted when each instruction is applied to each packet. Moreover some embodiments enable parsers with parsing rates over 100 Mpackets/second. Various embodiments achieve such speeds while requiring a relatively low size, cost, or power. Moreover, due to their architecture, various embodiments can be updated to adapt to new or evolved packet formats by using new microcode programs and without updating the hardware.

In various embodiments, one or more of modules disclosed in this disclosure are implemented via one or more software programs for performing the functionality of the corresponding modules or via computer processors executing those software programs. In some embodiments, one or more of the disclosed modules are implemented via one or more hardware modules executing firmware for performing the functionality of the corresponding modules. In various embodiments, one or more of the disclosed modules include storage media for storing data used by the module, or software or firmware programs executed by the module. In various embodiments, one or more of the disclosed modules or disclosed storage media are internal or external to the disclosed systems. In some embodiments, the disclosed storage media for storing information include non-transitory computer-readable media, such as a computer storage, e.g., a hard disk, or a flash memory, or other types of processor memory. Further, in various embodiments, one or more of the storage media are non-transitory computer-readable media store information or software programs executed by various modules or implementing various methods or flow charts disclosed herein.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not described in the embodiments. Accordingly, the invention is not limited to the above-described embodiments, but instead is defined by the appended claims in light of their full scope of equivalents.

The invention claimed is:

1. An engine comprising:
   a DMEM configured to store packet data for multiple packets, wherein the DMEM is divided into a plurality of DMEM subsections;
   a plurality of register sets configured to store parsing instructions and/or parse results, wherein each register set of the plurality of register sets is paired with a DMEM subsection of the plurality of DMEM subsections;
   an arithmetic logic unit (ALU) configured to perform packet parsing operations,
   wherein, the engine is configured to:
      parse a first packet stored in a first DMEM section after a first register set is initialized for the first packet, wherein the first register set and the first DMEM section are paired;
      during parsing the first packet, load a second packet in a second DMEM subsection and initialize a second register set for the second packet, wherein the second register set and the second DMEM section are paired; and
      parse the second packet after the parsing the first packet completes.

2. The engine of claim 1, wherein the engine is comprised in a cluster of engines comprising a plurality of engines, and wherein the plurality of engines are configured to access a shared memory, and wherein the engine is configured to receive data from the shared memory or to send data to the shared memory.

3. The packet parsing engine of claim 2, wherein each of the plurality of engines is configured to execute a parsing instruction with an added delay from a previous engine executing the parsing instruction.

4. The engine of claim 1, wherein the engine is further configured to, during parsing the second packet, unloading the first packet.

5. The engine of claim 1, wherein the engine is further configured to swap among pairs of DEM subsection and register set based on an address bit to addresses of the plurality of DEM sections.

6. The engine of claim 1, wherein the parsing instructions are 64 bits wide, and wherein the DMEM, the plurality of register sets, and the arithmetic logic unit communicate via 16 bit data.

7. A method of parsing packet data by a packet parsing engine, wherein the engine includes a DMEM, a plurality of register sets, and an arithmetic units (ALU), the method comprising:
   storing a first packet in a first DMEM subsection, wherein the DMEM is configured to store multiple packets, wherein the DMEM is divided into a plurality of DMEM subsections,
   initializing a first register set for the first packet, wherein the plurality of register sets are configured to store parsing instructions and/or parse results, wherein each register set of the plurality of register sets is paired with a DMEM subsection of the plurality of DMEM subsections, and wherein further the first DMEM subsection and the first register set are paired;
   parsing the first packet by using the ALU;
   during parsing the first packet, loading a second packet in a second DMEM subsection and initializing a second register set for the second packet, wherein the second register set and the second DMEM section are paired; and
   parsing the second packet after the parsing the first packet completes.

8. The method of claim 7, wherein the engine is one engine of a plurality of engines, the method further comprising accessing a shared memory that is configured to be accessed by the plurality of engines, wherein the accessing includes receiving data from the shared memory or sending data to the shared memory.

9. The method of claim 8 further comprising each of the plurality of engines decoding and executing the parsing instruction with a delay from a previous engine executing the parsing instruction.

10. The method of claim 7, wherein the parsing instructions are wide 64 bits.

11. The method of claim 7, further comprising sending communications among the DMEMs, the plurality of register sets, and the arithmetic logic unit via 16 bit data.

12. A packet parser comprising:
   a cluster of engines, wherein each engine of the cluster of engines comprises:

a DMEM configured to store packet data for multiple packets, wherein the DMEM is divided into a plurality of DMEM subsections, a plurality of register sets configured to store parsing instructions and/or parse results, wherein each register set of the plurality of register sets is paired with a DMEM subsection of the plurality of DMEM subsections;

an arithmetic logic unit (ALU) configured to perform packet parsing operations, wherein, the engine is configured to:

parse a first packet stored in a first DMEM section after a first register set is initialized for the first packet, wherein the first register set and the first DMEM section are paired;

during parsing the first packet, load a second packet in a second DMEM subsection and initialize a second register set for the second packet, wherein the second register set and the second DMEM section are paired; and parse the second packet after the parsing the first packet completes;

a shared memory accessible to the cluster of engines; and an arbiter coupled to the cluster of engines and the shared memory and configured to arbitrate access to the shared memory among the cluster of engines.

13. The packet parser of claim 12, wherein the engine is further configured to, during parsing the second packet, unloading the first packet.

14. The packet parser of claim 12, wherein the engine is further configured to swap among pairs of DEM subsection and register set based on an address bit to addresses of the plurality of DEM sections.

15. The packet parser of claim 12, wherein the arbiter is configured to delay a response to an engine request for accessing the shared memory.

16. The packet parser of claim 15, wherein the arbiter is further configured to cause the cluster of engines to have different execution time for parsing packets.

* * * * *